Sept. 24, 1963 L. A. VALLET 3,104,643
HATCH COVER AND SEALING DEVICE THEREFOR
Filed July 6, 1960 3 Sheets-Sheet 1

INVENTOR.
Lester A. Vallet
BY
Townsend and Townsend
attorneys

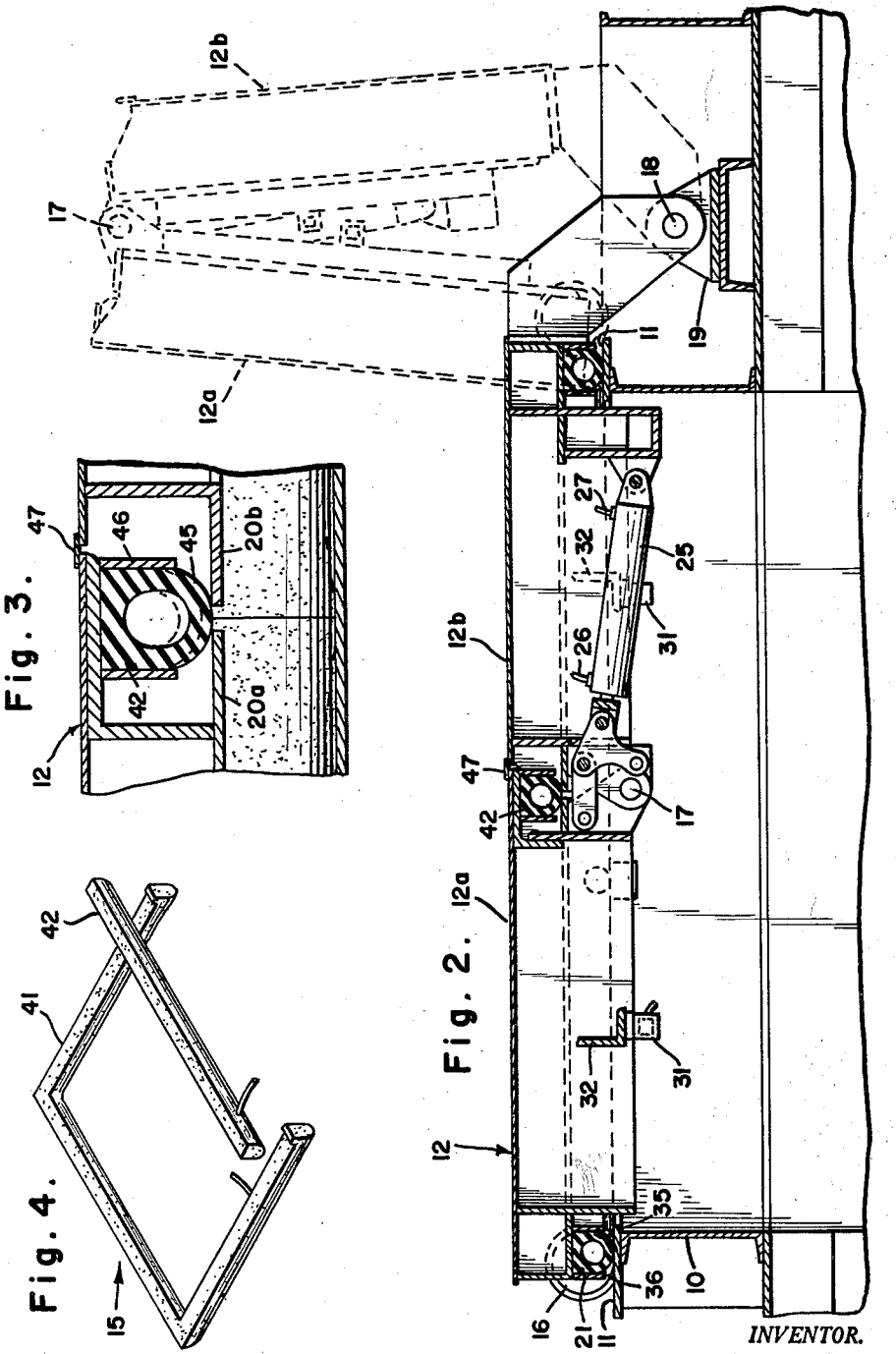

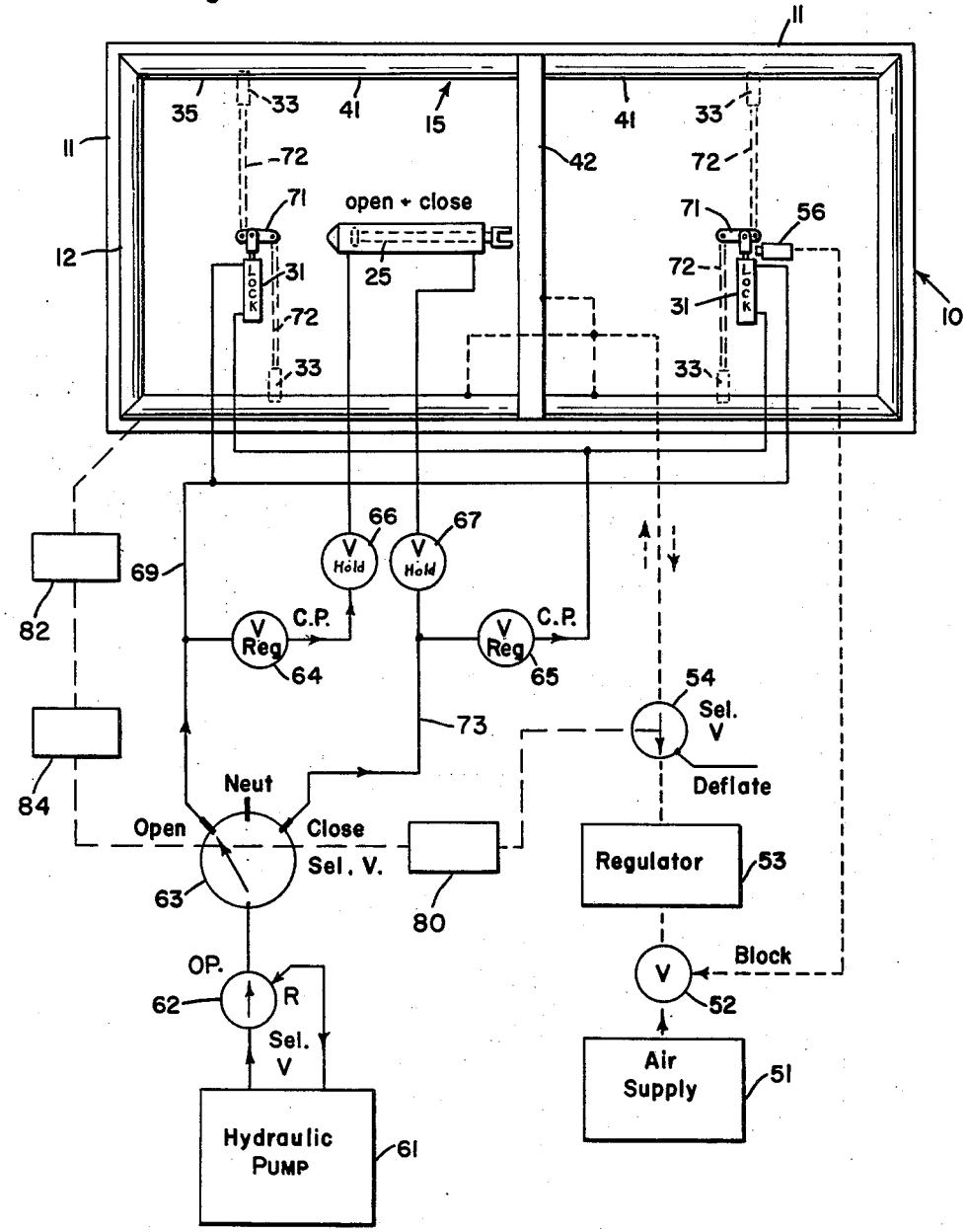

United States Patent Office 3,104,643
Patented Sept. 24, 1963

3,104,643
HATCH COVER AND SEALING DEVICE
THEREFOR
Lester A. Vallet, San Francisco, Calif., assignor to States Steamship Company, San Francisco, Calif., a corporation of Nevada
Filed July 6, 1960, Ser. No. 41,100
8 Claims. (Cl. 114—202)

This invention relates to weatherproof hatches for ships, barges and the like, and more particularly to means for automatically closing and sealing hatches.

A principal object of the present invention is, therefore, to provide a fully satisfactory weatherproof hatch cover for hatchways of ships and barges.

Another object of the present invention is to provide a hatch cover which effectively seals off the cargo space and which is substantially automatic in operation.

Yet another object of the invention is to provide sealing means for a hatch cover which are not dependent upon the uniformity of the mating surfaces of the hatch and hatchway coaming.

Yet other objects of the present invention are to provide sealing means which may be adjusted easily, means for controlling the sequence of operating events to prevent malfunction, and a substantially automatic system.

A feature of the invention pertains to a hatch cover pivotally supported at one end of a hatchway coaming for movement to a position immediately over the hatchway.

Another feature of the invention pertains to the use of inflatable gaskets to form effective seals between the hatch cover and coaming.

Yet another feature of the present invention pertains to means for varying the pressure in the inflatable gaskets to control the effectiveness of the seal.

Still another feature of the invention pertains to means for maintaining the hatch cover in its closed position so that the sealing gasket may be inflated to effectively block the space between the hatch cover and hatchway.

More particularly, a feature of the invention pertains to the combination of a hatch coaming defining a cargo space opening in a deck, a hatch cover, an inflatable gasket supported along the under side of the hatch cover, means operable to position the hatch cover immediately above the coaming, means to maintain the hatch cover thereover, and variable means operable to inflate the gasket to form an effective seal between the hatch cover and coaming.

Still more particularly, a feature of the invention pertains to the combination of a coaming defining a hatchway, a hatch cover rotatably supported adjacent one end of the coaming for movement between a retracted, open position at one side of the hatchway and an extended, closed position overlying the coaming, means to move the hatch cover to its closed position, an inflatable gasket supported along the underside of the hatch cover adjacent the perimeter thereof and with the gasket overlying the coaming when the hatch cover is closed, means to lock the hatch cover in the closed position, and means to expand the gasket whereby the gasket bears firmly against the coaming to prevent the ingress of water into the hatchway.

These and other objects, advantages and features of the present invention may be more fully understood when the following detailed description is read with reference to the drawings, in which:

FIG. 2 is an enlarged side-view section of a hatch cover constructed in accordance with the present invention in its closed position;

FIG. 3 is an enlarged partial section illustrating the cooperation between the inflatable gaskets, the hatch cover and coaming;

FIG. 4 is a perspective of the exemplary inflatable gaskets when removed from one section of the hatch cover to illustrate their relative positions in situ; and FIG. 5 is a schematic diagram illustrating the cooperation between the hydraulic and pneumatic controls and the weatherproof cover.

Figure 1:
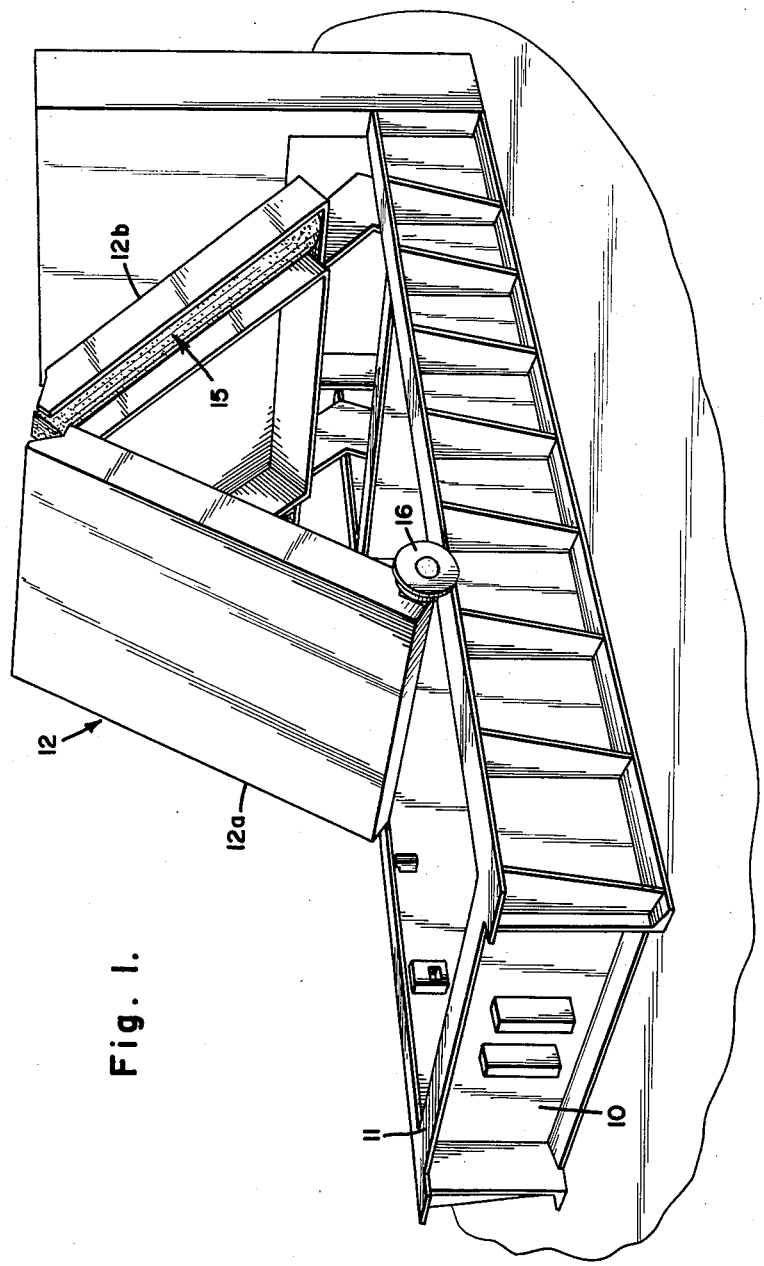
FIG. 1 is a perspective of a weatherproof cover constructed in accordance with the present invention supported on a hatch coaming in a partially open position.

The weatherproof hatch cover of the present invention is formed in two pieces which are rotatably connected at one set of ends so that the hatch cover may be folded as it is opened. One end of the hatch cover is rotatably supported at one end of the coaming and the opposite end of the hatch cover carries guide rollers that engage the sides of the coaming. The hatch cover sections lie in a common plane in their closed position and fold to one side of the hatchway when the hatch cover is retracted.

The general relation of the parts is illustrated in FIG. 1. An upstanding hatch coaming 10 is secured to the deck or other surface defining an opening into the hold of a ship or barge. The hatch coaming 10 is substantially rectangular in configuration and has a continuous flat horizontal surface 11 around the perimeter of the coaming with which a hatch cover 12 cooperates. The hatch cover 12 is formed of sections 12a and 12b which are pivotally connected along their common ends by a pin 17 (see FIG. 2). One section of the hatch cover, 12a for example, has a pair of rollers 16 rotatably mounted outwardly at its uncommon end to guide the hatch cover 12 when it is moved. The axis of the rollers 16 and the axis 17 are parallel. The opposite end of the hatch cover (non-common end of hatch cover section 12b) is rotatably supported on the desk or coaming 10 by support member 19.

With this particular arrangement, the hatch cover 12 is closed by moving sections 12a and 12b over the hatch coaming (toward the left of FIG. 1). This rotates section 12a with respect to 12b in order to form a flat, substantially horizontal hatch cover 12. As the section 12a is moved over the hatch coaming 10, section 12b is pivoted with respect to its support member 19. Contrariwise, when it is desired to open the hatch cover 12, section 12a is moved toward the right side of the hatch coaming 10 (to the right of FIG. 1) which causes sections 12a and 12b to fold up into a substantially vertical position, as illustrated in part.

The cooperation of the hatch cover 12 and coaming 10 may be more easily understood by reference to FIG. 2. Sections 12a and 12b of the hatch cover 12 are pivotally connected by axial pin 17 for rotation relative to each other. Section 12b is pivoted at its other end on axial pin 18 which is held in a support member 19 that is affixed to the coaming 10 or other part of the deck (not shown). The other end of section 12a supports an axial pin 21 which, in turn, rotatably supports guide rollers 16 beyond the sides of the hatch cover 12. Guide rollers 16 are arranged to ride on the side upper surface 11 of the hatch coaming 10 and guide the free end of the hatch cover 12 as the cover is moved from over the hatchway.

FIG. 2 illustrates the hatch cover 12 in its closed position with the gaskets 15 inflated, but the open position of sections 12a and 12b are illustrated by the dotted lines. A hydraulic piston 25 is connected between sections 12a and 12b and is operable to cause the hatch cover 12 to open or close. When hydraulic fluid is caused to flow into the piston side 26 of hydraulic cylinder 25, the piston is extended and the hatch cover 12 is caused to open, whereas as hydraulic fluid flows into rod side 27, the hatch cover 12 is caused to move over the hatch coaming 10 to its closed position. The operation of hydraulic cylinder 25 in the system is explained in more detail hereinafter.

Also affixed to the underside of the hatch cover sections 12a and 12b by brackets 32 are hydraulic locking cylinders 31 which are controlled to move lugs 33 outwardly (by means described hereinafter) with respect to the sides of the hatch coaming to engage a lip 35 on the coaming 10 (see FIG. 5) thereby to maintain the cover 12 in its closed position.

The lowermost surface 36 of the hatch cover 12 (FIG. 3) is supported immediately above the surface 11 of the hatch coaming 10. The size of this gap determines the sealing pressure and the size of the sealing member 15 which must be employed. Once the cover 12 is in its fully closed position overlying the hatch coaming 10, the hydraulic locking cylinders 31 and 32 are actuated to prevent the cover 12 from moving away from the coaming surface 11. At this point, the inflatable gasket or seal 15 is inflated to form a weatherproof seal between the hatch cover 12 and the coaming 10.

The exemplary sealing means 15 consists of three inflatable tubes constructed of neoprene or some similar material and operable to seal the hatch cover around the circumference of the sections 12a and 12b and also along the common joint therebetween. The inflatable gasket 15 consists of two U-shaped parts 41 which are disposed underneath the sections 12a and 12b and a single section 42 arranged transversely to the sections immediately under section 12a. The bight of the U-portions of sections 41 are disposed substantially parallel to the pivotal axes for the hatch cover 12 as is the center sealing gasket 42. The general relationship between the inflatable gaskets 41 and 42 and the hatch cover 12 and coaming 10 may best be seen in FIG. 5, whereas exemplary means of support for the gaskets are illustrated in FIGS. 2 and 3.

Looking particularly to FIG. 3, a typical support for gasket section 42 is illustrated. The gasket 42 is formed of a generally rectangular cross section with one curvilinear side. When deflated, the gaskets approximate the dotted line contour 45 which is, as will be observed, out of contact with the lower surface 20 of hatch cover sections 12a and 12b. The straight sides of the inflatable gasket 42 are held by a U-shaped member 46 which is affixed to section 12a. Upon inflation of gasket 42 it assumes the position illustrated and effectively seals the opening between lower parts 20a and 20b of the sections 12a and 12b, respectively. A flat strip 47 is also attached to section 12a to provide an overlay for the opening between the sections when the hatch cover is closed.

While the two U-shaped sections of gasket 41, which are disposed underneath the hatch cover 12 and about the outside of the sections 12a and 12b, do not form a seal between adjacent plates, as does gasket 42, they bear against the flat surface 11 on the coaming 10 to provide the necessary seal. The U-shaped gasket sections may be supported underneath their respective sections 12a and 12b in a manner similar to that of section 42.

The effectiveness of the sealing for the present weatherproof hatch is directly dependent upon the pressure employed in inflating gaskets 41 and 42 as well as the separation between the lower surfaces of the hatch cover 12 and the surface 11 on the coaming 10. By varying the inflation pressure the degree of sealing can be changed. For example, if the pressure is 50 p.s.i., changes in the gap from $9/16$ of an inch to $13/32$ of an inch changes the load per lineal foot of gasket from 932 lbs. to 450 lbs. Within these gap variations, changes in the pressure can make marked changes in sealing pressures on a lineal foot basis.

It can also be appreciated that the use of such inflatable sealing devices makes the surface configurations less critical than is the case for prior art hatch sealing techniques. The flexibility of the inflatable gaskets, which permits them to assume the irregular contours of their mating surfaces, reduces the criticalness of the surfaces. It permits an effective and efficient seal to be provided under a variety of operating conditions.

The operation of the hatch cover is automatic once set in motion. A circuit for schematically opening and closing the cover is illustrated in FIG. 5. An air supply 51 cooperates with a blocking valve 52, a regulator 53, a selector valve 54 and an inflation detector 56. Appropriate connecting tubes are provided between the components and the gaskets. Also forming part of the circuit are a hydraulic pump 61, a recirculating selector valve 62, a manual function selector valve 63, regulating valves 64 and 65 and associated holding valves 66 and 67. This latter equipment cooperates with the hydraulic drive cylinder 25 and locking cylinders 31 to lock the hatch cover and also to open and close it.

The operation may best be understood by assuming the hatch cover 12 is closed, the hydraulic cylinders 31 are operated to lock the hatch cover 12 in its closed position, and the sealing means 15 is inflated. At this point, if it is desired to open the cover, the air selector valve 54 is turned to the deflate position (D) which permits the air in sealing means to be discharged. After the air pressure in gaskets 41 and 42 is released, manual selector valve 62 is set in the operate position (OP) and valve 63 in the open position.

With these settings, fluid from hydraulic pump 61 flows through valves 62 and 63 to the piston side of hydraulic locking cylinders 31 causing them to pivot rocker arms 71. This withdraws locking lugs 33 from under the lip 35 of the coaming 10 through actuation of linkages 72. Thereafter, as soon as the pressure builds up in line 69 sufficiently to operate regulating valve 64, fluid flows through valve 64 and hold valve 66 to the piston side of drive cylinder 25. The piston in the drive cylinder 25 is displaced to open the hatch cover 12. Valve 64 is a regulator type of valve which requires a preselected input pressure in order to actuate it. So, it is only after locking cylinders 32 operate and the pressure build up in line 69 occurs that valve 64 opens to allow fluid to flow to cylinder 25. Holding valve 66 is biased to assure that the pressure in the piston side of hydraulic cylinder 25 continues to be sufficient to hold hatch cover 12 open.

Once the locking cylinders 31 are operated and hydraulic cylinder 25 extended to open the hatch cover 12, it remains open until the selector valves 63 and 54 are changed. When it is desired to close the hatch cover 12, the selector valve 63 is moved to the close position, which causes fluid to flow from hydraulic pump 61 through selector valves 62 and 63 into line 73. Fluid in line 73 flows through hold valve 67 directly into the rod side of drive cylinder 25 causing the piston to retract with the result that hatch cover sections 12a and 12b are extended to their closed position. As soon as the hatch cover 12 is completely closed, the pressure in line 73 builds up until regulator valve 65, which is similar to valve 64, opens to permit fluid to flow to the other sides of hydraulic locking cylinders 31. This flow of fluid into locking cylinders 31 causes them to operate linkages 71 and 72 which, in turn, forces locking lugs 33 outwardly to positions underlying the lip 35.

As soon as lugs 33 have locked the hatch cover 12 in the closed position, air selector valve 54 in the air circuit is set to the inflate position (I) and air from air supply 51 is moved through valve 52, regulator 53 into the gaskets 41 and 42. At this point, the hatch is closed and the weatherproof seal is effected.

Detecting device 56 cooperates with one of the locking cylinders 31 to block the flow of air from air supply 51 to regulator 53 during the time the hatch cover 12 is open even through valve 54 has been set to (I).

Means are also provided in a fully automatic system for preventing the opening of the hatch as long as the sealing device 15 is inflated. Selector valve 62 may be made responsive to the inflation of gasket 15 to recycle fluid in hydraulic pump 61 so as to prevent the opening or closing of the hatch when the gasket is inflated. Similar means may be employed to render the overall system fully automatic, including the operation of selector valves 54, 62 and 63, as well as air supply 51 and hydraulic pump 61. It should be understood that the valves, hydraulic pump and air supplies, per se, form no part of the present invention. It is only their combination which is pertinent to the present invention.

Operation of the present system can be made substantially automatic by inclusion of sequential means 80 which is responsive to the second or open position of manual control means 63 sequentially to deflate the sealing means or gasket 15 and to release the locking means comprising locking cylinders 31 and lugs 33 only after deflation of the gasket. Also provided in the automatic system is inflation sensing means 82 which is responsive to the inflated condition of gasket 15. Associated with inflation sensing means 82 is stop means 84 which responds to inflation of gasket 15, as sensed by the inflation sensing means, to stop the connection of hydraulic fluid from the operating means constituted by pump 61 and selector valve 62 to cylinder 25, the closure means.

In operation, the automatic control apparatus functions as follows: when the hatch cover 12 is in the closed position with the gasket 15 inflated, the hatch cover is opened by moving function selector control valve 63 to the "open" position. Sequential means 80 is responsive to such position of function selector control valve 63 to deflate gasket 15 through valve 54 and then, in sequence, to actuate and release locking cylinders 31 through line 69. When the locking cylinders reach their unlocked position so as to withdraw lugs 33 from engagement with lip 35, an increase in the pressure in line 69 is sensed by regulating valve 64, and fluid is conveyed through valves 64 and 66 to operating cylinder 25. The hatch cover is thus moved to the open position. Opening of the hatch cover in the foregoing manner is assured, because so long as gasket 15 is in an inflated condition, such condition is sensed by inflation sensing means 82, which means in cooperation with stop means 84 stops the connection of hydraulic fluid to operating cylinder 25. In automatically moving the hatch cover from an open position to a closed position, the function selector control valve is moved to the "close" position by an operator to actuate hydraulic cylinder 25 and then locking cylinders 31 when the cover rests on coaming 10. Regulating valve 65 assures that the hatch cover will close entirely before locking cylinders 31 are actuated in a manner described hereinabove. When lugs 33 are in a locked position, air is supplied to gasket 15 since sensing device 56 responds to the locked position of a cylinder 31 to unblock valve 52 which is interposed between air supply 51 and the gasket. Thus, the entire operation of the hatch cover, the hatch cover locking means, and the hatch cover sealing gasket is controlled automatically from function selector control valve 63.

From the foregoing description, it can be seen that the present invention contemplates an automatic system for closing, opening and/or sealing a hatch. By employing a gasket type of sealing medium in combination with the locking means and cover opening means, it is possible to simply, effectively and automatically close and open the weatherproof hatch. Such a hatch avoids the disadvantages of the prior art systems in that it requires no manual labor, it requires no critical coaction between mating surfaces, and it is easily adjustable to vary the degree of sealing.

While the invention has been described with respect to an exemplary embodiment, it should be apparent to those skilled in the art that certain modifications may be employed without departing from the inventive concept. For this reason, the invention should only be limited to the extent of the appended claims.

What is claimed is:

1. Apparatus for covering a hatchway on a ship, barge or the like comprising, in combination, a coaming having a relatively flat upper surface defining a hatchway, a multi-section hatch cover rotatably supported adjacent one end of the coaming for movement between a retracted, open position and an extended, closed position, the latter position being immediately above the flat surfaces of said coaming, rollers movably supporting the opposite end of the hatch cover upon the flat upper surface of the coaming, means to move the hatch cover to its closed position, inflatable gaskets supported along the under side of said hatch cover adjacent the perimeters of the sections thereof, said gaskets overlying the flat surfaces of said coaming when the hatch cover is closed, means for locking the hatch cover in said closed position, and means responsive to the closed position of said hatch cover to expand said gaskets whereby the gaskets bear firmly against adjacent edges of said sections and the flat surfaces of said coaming to prevent the ingress of water into said hatchway.

2. A system for covering a hatchway on a ship, barge or the like comprising, in combination, an upstanding rectangular coaming fixedly attached to the deck of a ship to define a hatchway, said coaming having a relatively flat horizontal surface about its perimeter which extends slightly interior of the sides of the coaming to form a projecting lip, a substantially rectangular hatch cover including first and second sections pivotally pinned together along one set of their ends for relative movement about an axis parallel to the ends of the coaming, means associated with the deck adjacent one end of the coaming to support the hatch cover along the other end of the first section for rotation about an axis parallel to the ends of the coaming, guide rollers rotatably supported by the other end of the second section to support the hatch during movement by bearing against the side flat surfaces of the coaming, a drive cylinder pivotally connected between the lower sides of the sections, said cylinder being extendable to fold the sections to a substantially upstanding position at one end of the coaming and retractable to move the sections to a flat position overlying the coaming, locking cylinders and associated linkages cooperating with the lower side of each of said sections, said linkages responsive to the extension of said locking cylinders to move outwardly toward the sides of the coaming and engage the projecting lip on the coaming, substantially U-shaped resilient gaskets supported underneath the hatch cover and around the perimeter thereof and inflatable to form a weathertight seal against the flat surfaces on said coaming, a second resilient gasket disposed parallel to the pivotally pinned ends of the coaming and supported immediately underneath the one end of one of the sections adjacent the one end of the other, said second gasket inflatable to form a watertight seal between said sections, and means to operate the drive cylinder, locking cylinders and inflate the gaskets to form a weathertight seal about the perimeter of said hatch cover and between the sections thereof.

3. In a system for covering a hatchway with a hatch cover rotatably supported at one side of the hatchway for movement to a closed position overlying the hatchway, the combination of a hatchway defining an opening to the hold of a ship, a hatch cover rotatably supported at one side of the hatchway, closure means associated with the hatch cover and operable to move the hatch cover between a closed and an open position, locking means operable to lock the hatch cover in the closed position, inflatable sealing means carried by said hatch cover inflatable to form a weathertight seal between the hatch cover and hatchway, manual control means, operating means responsive to a closed position of the manual control means to cause said closure means to move said hatch cover to the closed position, first detecting means responsive to the closure of said hatch cover to cause said locking means to lock the hatch cover in the closed position, means operable after said locking means is operated to inflate said sealing means, means responsive to an open position of said manual control means to permit said sealing means sequentially to deflate and to release said locking means, second detecting means responsive to the release of said locking means to enable said operating means to cause said hatch cover to move to the open position, means responsive to the inflated condition of the sealing means to stop the connection of the operating means to the closure means, and means responsive to the release condition of said locking means to block the operation of said inflating means.

4. Apparatus for covering a hatchway on a ship comprising a coaming affixed to the deck of the ship entirely surrounding the hatchway, a continuous flat surface around the perimeter of said coaming, a hatch cover including first and second substantially rectangular sections pivotally pinned together along one set of the ends of the sections for relative movement, means affixed to the deck adjacent one end of the coaming for pivotally supporting the hatch cover along the other end of the first section for movement about an axis parallel to the ends of the coaming, guide rollers rotatably attached to the corners of the other end of the second section for rolling engagement with the flat surface of said coaming, drive means cooperating with said sections to fold the hatch cover to a substantially upstanding position at one end of the coaming and to move the sections to a flat position overlying the coaming, means to lock the hatch cover in the closed position, a generally U-shaped downwardly open member attached to the outside perimeter of said hatch cover in a pattern generally congruent to said flat surface around said coaming, an inflatable gasket for placement in said U-shaped member, said gasket in its deflated condition being adapted to reside entirely within said U-shaped member and in its inflated condition to extend below said U-shaped member, means for sealing the joint between said first and second sections, and means to operate said drive and locking means and to inflate said gasket in proper sequence to seal the hatchway.

5. A system for covering a hatchway comprising in combination a hatchway defining an opening to the hold of a ship, a hatch pivotally supported at one side of the hatchway, means for moving the hatch between a closed position and an open position upon the hatchway, means for locking the hatch in a closed position upon the hatchway, inflatable sealing means carried beneath the periphery of the lower surface of the hatch, means depending from the periphery of the lower surface of said hatch cover for supporting said inflatable sealing means out of contact with said hatchway when said sealing means is deflated, means for controllably inflating said sealing means, so that said sealing means extends below said supporting means and means responsive to said hatch locking means for inflating and sealing means only when said locking means has locked the hatch in a closed position upon the hatchway.

6. Apparatus according to claim 5 in combination with means responsive to the closed position of the hatch cover for actuating said hatch locking means.

7. Apparatus according to claim 5 in combination with means responsive to the closed position of the hatch cover for actuating said hatch cover locking means, means for releasing said hatch cover locking means, and means responsive to said releasing means for actuating the hatch cover moving means to move the hatch to a closed position.

8. Apparatus for covering a hatching on a ship, barge or the like in accordance with claim 1 in which said hatch cover has parallel flanges depending from the periphery of its lower surface forming a U-shaped member for retaining said gaskets, said flanges adapted to extend below said inflatable gasket only when said gasket is in a deflated position and including means responsive to the released state of the locking means to prevent the expansion of said gasket when the locking means is in the released state.

References Cited in the file of this patent

UNITED STATES PATENTS

| | | |
|---|---|---|
| 2,088,909 | Jaubert | Aug. 3, 1937 |
| 2,184,057 | Parker | Dec. 19, 1939 |
| 2,360,276 | Redmond | Oct. 10, 1944 |
| 2,551,750 | Liskey | May 8, 1951 |
| 2,682,150 | Ballinger | June 29, 1954 |
| 2,753,827 | Sabin | July 10, 1956 |
| 2,804,039 | Gray et al. | Aug. 27, 1957 |
| 2,857,874 | McBride | Oct. 28, 1958 |
| 2,945,467 | Wigeland | July 19, 1960 |